United States Patent [19]
Nabity et al.

[11] Patent Number: 5,371,686
[45] Date of Patent: Dec. 6, 1994

[54] ULTRASONIC FLUID VELOCITY MEASURING SYSTEM

[75] Inventors: Frederick A. Nabity; Larry L. Fritz; Douglas T. Carson, all of Lincoln, Nebr.

[73] Assignee: Isco, Inc., Lincoln, Nebr.

[21] Appl. No.: 860,325

[22] Filed: Mar. 30, 1992

[51] Int. Cl.$^5$ .................................................. G01F 1/66
[52] U.S. Cl. .................................. 364/510; 73/861.25
[58] Field of Search ............... 364/509, 510, 575, 576, 364/581, 726; 73/861.21, 861.25, 861.26

[56] References Cited
U.S. PATENT DOCUMENTS

| | | | |
|---|---|---|---|
| 4,713,971 | 12/1987 | Johannes | 73/861.25 |
| 4,790,323 | 12/1988 | Leavitt et al. | 128/661.09 |
| 5,020,374 | 6/1991 | Petroff et al. | 73/861.25 |
| 5,226,328 | 7/1993 | Petroff et al. | 73/861.25 |

Primary Examiner—Thomas G. Black
Assistant Examiner—Michael Zanelli
Attorney, Agent, or Firm—Vincent L. Carney

[57] ABSTRACT

To determine the average velocity of a fluid stream, an ultrasonic signal is transmitted into the fluid and reflected ultrasonic signal received. The signals are mixed with a frequency of the transmitted ultrasonic signals. A Fourier transform is performed on the signals, the largest coefficient used to normalize the signal and certain of the weighted signals are averaged.

16 Claims, 9 Drawing Sheets

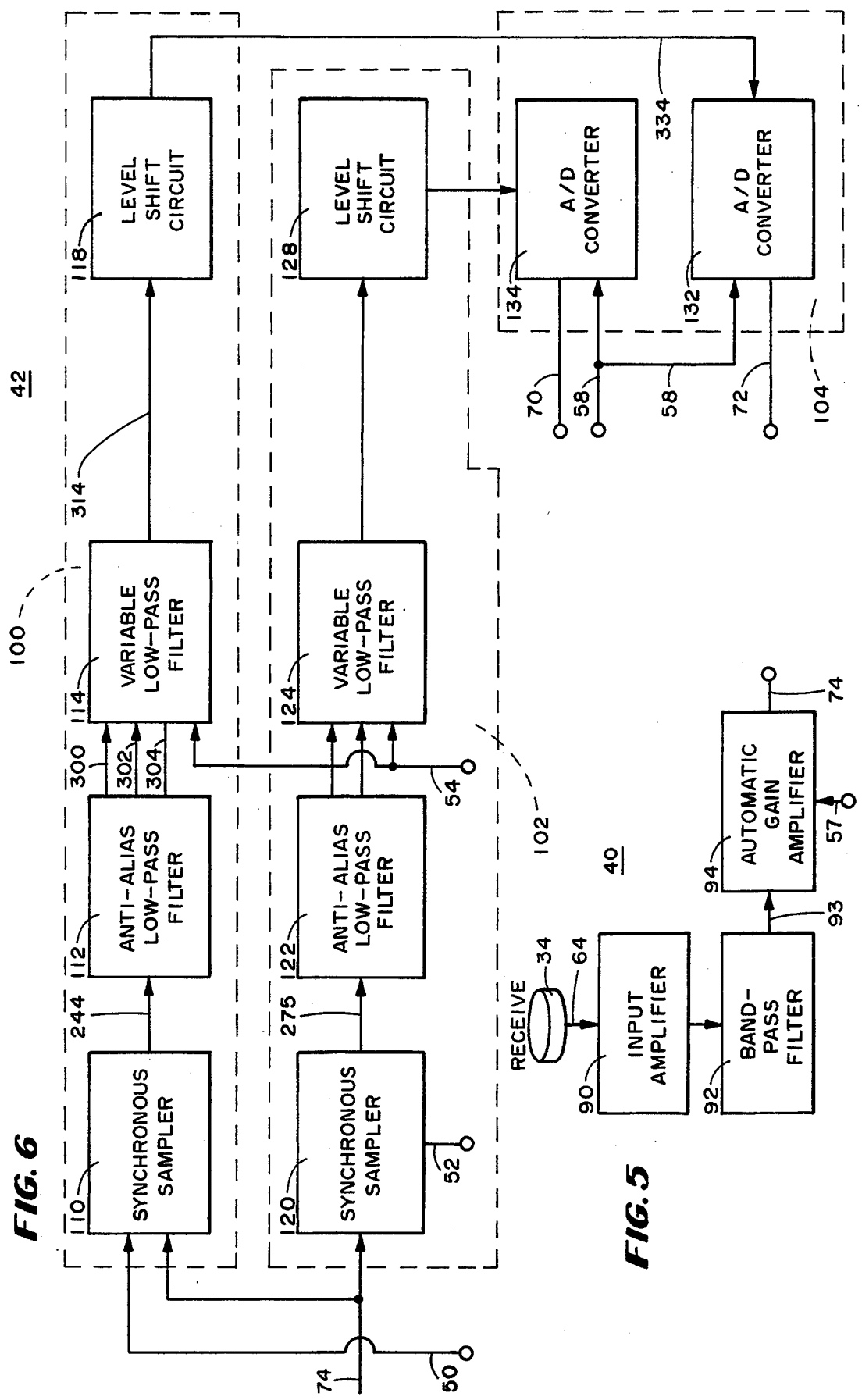

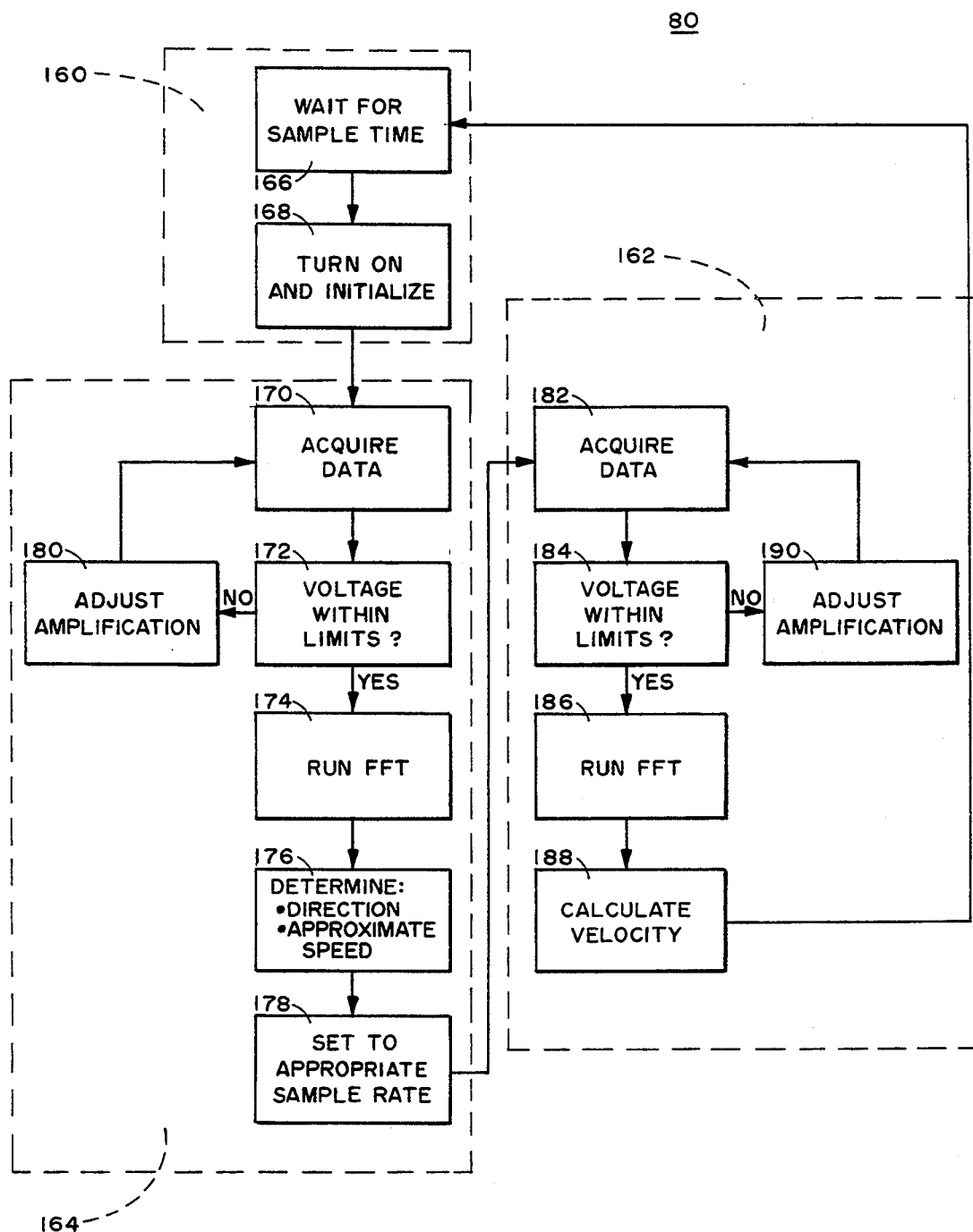

ULTRASONIC FLUID VELOCITY MEASURING SYSTEM

BACKGROUND OF THE INVENTION

This invention relates to methods and apparatuses for measuring the average velocity of a flow stream.

In one class of velocity measuring apparatuses, ultrasonic signals are transmitted through the flow stream of a fluid and the reflections received from reflective portions of the fluid are sensed. The Doppler shift in frequency between the transmitted signal and the received signal is used to determine the average velocity of the fluid.

In this class of average-velocity measuring apparatuses, the waveform for the combined Doppler shifts in frequency of reflected ultrasonic sound represents an average velocity of the flow stream because the Doppler frequency shift for each portion of the flow stream is proportional to the velocity of that portion, the amplitude of the sum of the reflected signals for each different frequency shift represents the volume of the fluid flowing with that velocity, and thus, the sum of the received signals is a waveform combining the amount of each different velocity portion of the fluid. Each different velocity portion of the fluid stream contributes to a component of the waveform and its component is proportional to the contribution from each other different velocity portion so that the amplitude for each corresponding frequency shift represents the proportionate amount of fluid flowing with that velocity.

The signals that are incident on reflecting portions of the flow stream near the transmitting transducer or transducers have a higher amplitude than those incident on reflecting portions of the flow stream more remote from the transmitting transducer. The difference in amplitude or intensity is caused by the distribution of energy through a solid angle as it moves from the transmitting transducer to the reflecting portion of the fluid. However, the energy incident on the remote portions impacts on a larger proportion of the fluid at each velocity at more remote distances than at close distances for reflection.

It is believed that this class of average-velocity measuring apparatuses relies on the nature of the flow stream and the intensity of the transmitted signal being such that an approximate compromise can be reached in which the attenuation and reduction intensity with distance is balanced by the increased area from which signals are reflected. This attenuation is caused by the wider distribution of the energy of the transmitted signal and the increased attenuation of the reflected signal over the longer distances. This balance causes the energy transmitted to areas at a distance before being reflected to result in a sensed signal the same as if the entire reflected energy had been reflected from the same plane in the cross-section of the flow stream so that the signal is representative of an average velocity of that cross-section.

Because the received signals mainly represent those sound waves that travel a straight path to the reflective portions of the flow path and are reflected in a straight path to the receiving transducer, the received signals do not include representative amounts of sound waves that are reflected at an obtuse angle such as by glancing off at an angle from a portion of the flow path nor do they include representative amounts of reflected sound waves from certain sides or low portions of the flow path. Thus, the final waveform may actually not include sound waves reflected from the entire cross-section because the transmitted waves miss some portions of the flow stream and some of the reflected waves do not impact directly on the receiving transducer. However, the final waveform must represent the total cross-section.

To cause the final waveform to represent the total cross-section, even though the receiving transducer does not receive a representative amount of sound waves from every portion of the flow path, a representative portion of the flow stream should be selected for measurement of average velocity in this class of average-velocity measuring instrument. This representative portion can be sensed by selecting the angle of the transducers to cut proportional amounts of each velocity of flow.

One prior art velocity measuring system of this class was manufactured and sold by a corporation called Montedoro-Whitney Corporation. That prior art apparatus received different frequency signals in the expected range on a transducer and filtered a set of frequencies which were then weighed and averaged.

This type of measuring apparatus has several disadvantages, such as for example: (1) the range of signals of interest shifts as the velocity of the flow stream shifts, resulting in some inaccuracies due to the selection of a less desirable set of frequencies to be examined; (2) the on-line measurements of a limited number of ranges of frequencies accomplished by that system results in some lack of precision; and (3) because of the lack of precision, an empirically determined velocity coefficient is desirable at most locations to correct the measurement.

SUMMARY OF THE INVENTION

Accordingly, it is an object of the invention to provide a novel apparatus for measuring the average rate of flow of a liquid in a flow stream.

It is a further object of the invention to provide a novel technique for measuring the average velocity of a stream.

It is a still further object of the invention to provide a novel Doppler shift apparatuses and methods for measuring average velocity that have high resolution.

It is a still further object of the invention to provide a novel Doppler-shift average-velocity meter that is able to directly correct for changes in the turbidity of the stream in a manner independent of variations in the amplitude of the combined reflected ultrasonic vibrations and noise received directly from the transmitted ultrasound.

It is a still further object of the invention to provide a Doppler-shift average-velocity measuring instrument that is capable of providing precision better than 30 percent of the actual average velocity without the need for correcting the received signal with an empirically determined velocity coefficient.

In accordance with the above and further objects of the invention, an average flow rate meter includes an ultrasonic Doppler transmitter and receiver under the control of an automatic range and threshold setting system. The velocity meter transmits sound through a representative section or through the entire cross section of the flow stream and receives a complex signal back which is digitized and analyzed using a fast Fourier transform analyzer.

The resolution of the measurement depends on the number of ranges of frequencies selected for each term of the Fourier transform analyzer across the full range of frequency shifts caused by the range of possible velocities in the flow stream. The expected velocity range is determined in the preferred embodiment and 256 bands of frequencies are selected for positive and negative terms of the Fourier transform analyzer.

To determine the expected velocity range, the input signal is sampled with a high sampling rate such as 11.1 kHz (kilohertz) and a correspondingly high cutoff point for the frequency shift. If the results of the Fourier transform do not provide a high energy distribution in the frequency range being sampled, the sampling rate and cutoff frequency are reduced until a range of frequencies representing a corresponding range of velocities is found that indicates the mid-range of the measured frequency shifts.

The transmitting tranducers and receiving transducers are acoustically shielded from each other in a single housing. This minimizes the amount of noise transmitted directly from the transmitting transducer to the receiving transducer and permits the control of gain in response to changes in the digital, processed signal as determined by the computer when an appropriate cutoff point for the low-pass filters has been found.

To calibrate the average-velocity meter, measurements are made using a model flow path with a known average velocity or an average velocity that can be precisely measured such as by collecting the fluid over a time period and measuring it. The values can be set for measured signals to equal the measured average flow rate.

A threshold amplitude is experimentally set at a level that may cause some received signals having Doppler frequency shifts to not be considered in the final calculation of average velocity because they are represented by low amplitude coefficients in the Fourier transform. This is done until an optimum value is found with a number of terms of the Fourier transform centered around the highest coefficient that provides the best result within the expected range of frequency shifts. This threshold is set for incorporation of the number of reflected signal frequency bands that provides the most constant readout during calibration.

As can be understood from the above description, the average-velocity flowmeter of this invention provides precision in a number of different flow paths and is less likely to have its precision disrupted by changes in the velocity of the stream.

DESCRIPTION OF THE DRAWINGS

The above-noted and other features of the invention will be better understood from the following detailed description when considered with reference to the accompanying drawings in which:

FIG. 5 is a block diagram of an input section of the embodiment of FIG. 4;

FIG. 6 is a block diagram of a signal processing section of the system of FIG. 4;

FIG. 18 is a block diagram of a computer program used for the control system of the embodiment of FIG. 3.

DETAILED DESCRIPTION

Figure 1:
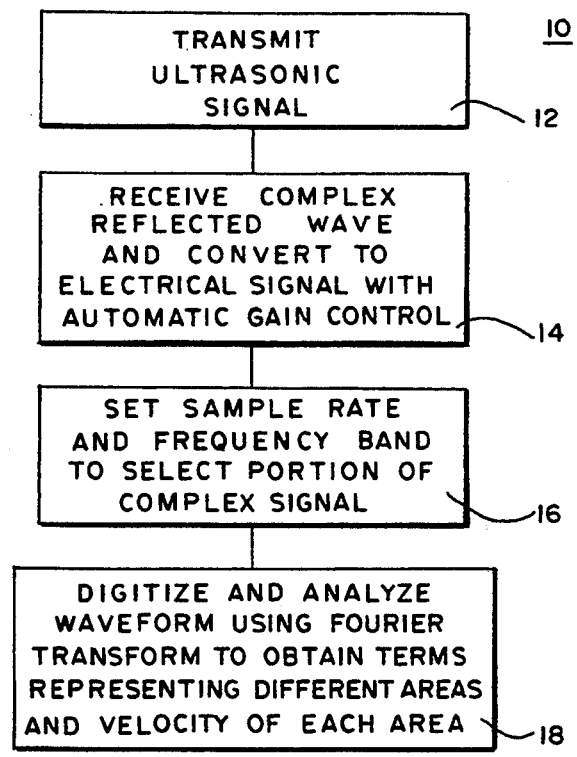
FIG. 1 is a block diagram of a process in accordance with the invention of measuring the average flow rate of a fluid stream.

In FIG. 1, there is shown a block diagram of a process 10 for measuring the average velocity of a liquid stream including the step 12 of transmitting an ultrasonic signal, the step 14 of receiving a complex reflected wave and converting it to an electrical signal, the step 16 of setting the sample rate and frequency band to select a portion of the complex signal characterizing average velocity and the step 18 of digitizing and analyzing the characteristic waveform using a Fourier transform to obtain terms representing different areas and velocities of each area. This process provides precise results because a large number of different frequencies can be examined.

Figure 2:
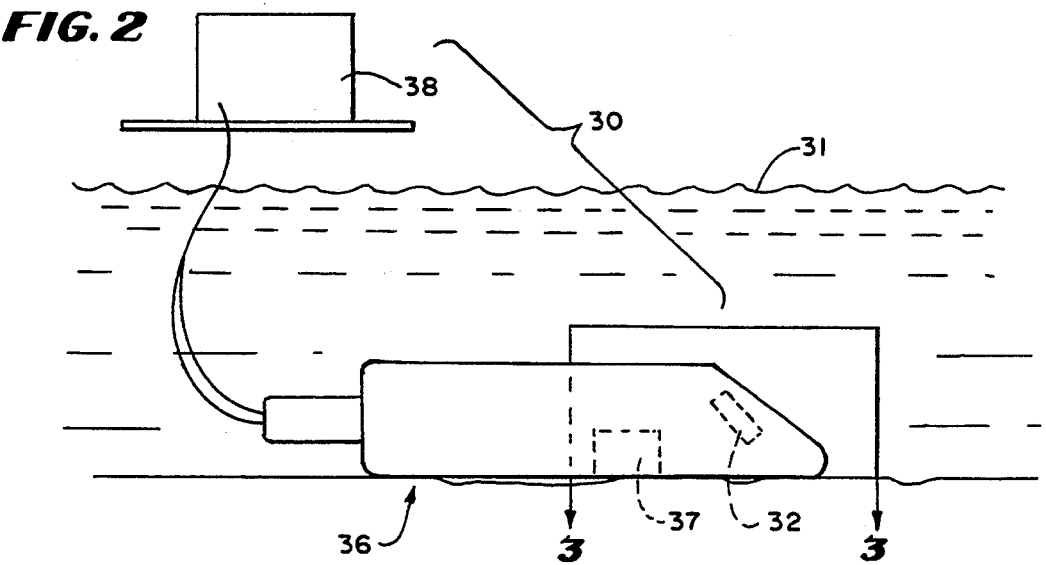
FIG. 2 is a schematic elevational diagram of a system for performing the process of FIG. 1.

In FIG. 2, there is shown a schematic drawing of a flowmeter 30 and stream 31, with the flowmeter 30 being positioned for measuring average flow velocity. The flowmeter 30 includes an underwater portion 36 and an above-water portion 38. The underwater portion 36 includes a transmitting transducer or transmitting transducer array section 32, a receiver or receiver array of transducers 34 (not shown in FIG. 2), a pressure sensor 37 and an above-ground circuit section 38.

With this arrangement, the receive and transmit transducers 34 and 32 are positioned substantially at an angle of one hundred twenty-five degrees to the horizontal to radiate a beam that is 35 degrees to the horizontal within a bottom-located underwater unit 36 having a leading edge at an angle of about one hundred forty-five degrees to the flow bed to transmit to and receive reflections from a representative portion of the flow stream 31. The receiving cone has a central axis parallel with the central axis of the transmitting cone.

In the alternative, any different angle can be used that obtains reflections from a representative portion of the flow stream 31 including different angles between the transmit and receive transducers and different or the same angles between the transducers and the leading edge of the housing. Moreover, more than one transducer can be used to cover a representative portion of the entire cross-section or the transducers can scan a representative portion or the entire cross-section of the flow path. They can be aimed at a focal point and the focal point moved for such scanning or they can be parallel to transmit along a cone having a transmitting cone axis and receive reflections transmitted back from portions of the transmitting cone that fall within the receiving cone.

The words, "representative portion", in this specification means a portion of the total flow stream which has a volume that includes within it smaller portions of fluid streams at each velocity flowing in the total flow stream with the fluid streams for each of the velocities of the smaller portions of flow streams having a reflective portion that is in the same proportion to the size of the reflective portion of the total flow stream having the same velocity as any other reflective smaller portion with a different velocity in the representative portion. That proportionality can be achieved in part by reflecting signals from a volume of the liquid rather than from an imaginary plane cutting the flow stream.

In this definition of a representative portion, each unit area flowing at a particular velocity in the representative portion has a ratio to the area of liquid of the total flow stream flowing at that rate which is the same ratio as every other cross sectional area flowing at that flow rate. Thus, this representative portion truly reflects the average flow rate of the entire flow stream.

In practice, some inaccuracy always occurs because of the failure to properly sample either the entire cross sectional area of the flow stream or a portion that is precisely a representative portion. Because it is easier to utilize a representative portion than the total cross sectional area, the preferred embodiment utilizes a representative portion and preferably arrives at this representative portion by selecting an angle at which the ultrasonic sound is reflected and selecting an angle at which it is received so that proportional amounts of the fluid flowing at each velocity reflect signals to the receiving transducer or transducers. One such error is caused by a lack of symmetry in the reflected signal with respect to an axis perpendicular to the transducer when the reflected signal is considered as a cone. It can be easily corrected, however- The lack of symmetry can be correct by using a fixed factor such as two percent or other value to account for the discrepancy.

Other approaches that may be used are: (1) scanning at different frequencies to reach different depths of particles that reflect signals; or (2) utilizing an array of transducers with pairs of them measuring the rate of flow most accurately in selected areas so that the sum of the signals represents the entire area; or (3) using cones which move to scan the entire area; or (4) by focusing the sound on certain representative reflecting portions and/or blocking portions of reflected signals so that the received signals are from a representative portion.

The underwater unit 36 in the preferred embodiment includes an amplifier for signals generated by the receiving transducer to amplify the signal above a noise threshold before transmitting it to the above-water unit 38 for further processing. However, any distribution of the circuitry may be utilized since it is only necessary for the transducers to be below the water level and any amount of the other circuitry may be enclosed in a water-tight container or may be contained in the above-water unit 38.

Figure 3:
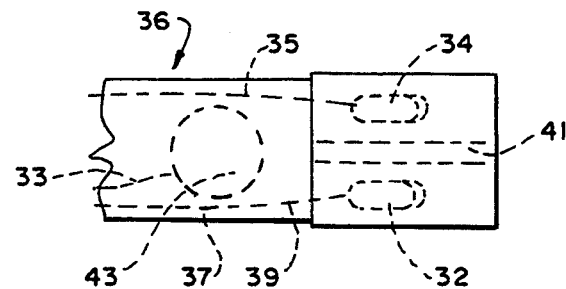
FIG. 3 is a sectional view through lines 3—3 of FIG. 2.

In FIG. 3, there is shown a fragmentary sectional view of the housing 36 taken through lines 3—3 of FIG. 2 showing the side-by-side transmit and receive transducers 32 and 34 separated by a wall of insulating material 41, which may be a plastic foam, to avoid cross-coupling of ultrasonic signals between the transmit transducer 32 and the receive transducer 34 within the housing 36. Additional material is added around the transducers to reflect and absorb sound between the transducers. The pressure sensor 37 and the transducers 32 and 34 are electrically connected to the above ground section 38 (FIG. 2) through the cables 33, 39 and 35, respectively.

The 145 degree face of the housing 36 reduces water turbulence and resistance flowing over it while the 35 degree angle with a flow bed from the parallel transducers 32 and 34 enables more complete sensing of the flowing liquid by lowering the blind spot where the transmitted signal does not result in reflected signals that impinge upon the receiving transducer. To reduce errors from refraction of the sound, the portion of the probe between the transducers and the water is filled with a material having an index of refraction close to that of water. In the preferred embodiment, the material is a polybutadiene-based liquid urethane sold under the trademark, Conathane, under the designation, EN-4, by Conap Inc., 1405 Buffalo Street, Olean, N.Y. 14760.

The solid state pressure sensor 37 communicates with the flow bed through an opening 43 near the bottom of the cabinet to receive the full pressure indicating the depth of the flow stream. With this arrangement, the area of the flow stream may be calculated to enable a measurement between the measured average velocity and the area to obtain the rate of flow of liquid in the flow stream.

Figure 4:
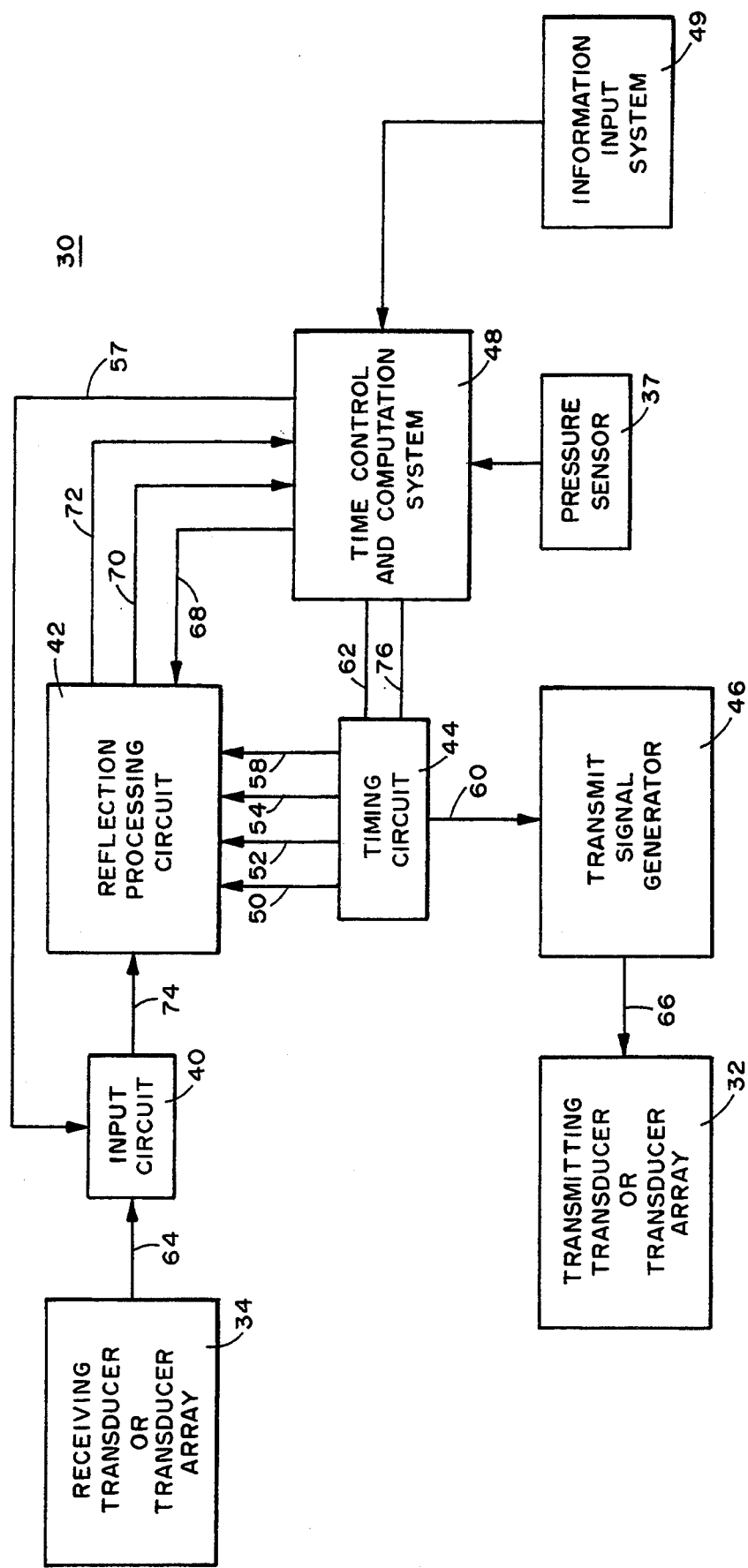
FIG. 4 is a block diagram of the apparatus of FIG. 2.

In FIG. 4, there is shown a block diagram of the flowmeter 30 having an input circuit 40, a reflection processing circuit 42, a time-control and computation system 48, an information input system 49, a timing circuit 44 and a transmit signal generator 46. The input circuit 40 is electrically connected to the receiving transducer or transducer array 34 through a conductor 64 to receive signals therefrom, amplify them with automatic gain control and transmit the signals to the reflection processing circuit 42 through a conductor 74.

The reflection processing circuit 42 is electrically connected to: (1) the timing circuit 44 through the conductors 50, 52, 54 and 58 which control the scanning of amplitudes and setting of the threshold value; and (2) the time-control and computation system 48 through conductors 70 and 72 through which it transmits data for use by the time-control and computation system 48 and through the conductor 68 from the time control and computation system from which it which receives signals which control the time of transmission of data to the time control and computation system.

The time-control and computation system 48 is electrically connected to the timing circuit 44 through conductors 62 and 76 to control the synchronization of the entire flowmeter 30 and to establish sampling rates and frequency cutoff points to the input circuit 40 to adjust the amplitude level of an automatic gain control circuit to obtain an adequate signal. The timing circuit 44 electrically connected to the transmit signal generator 46 through conductor 60 through which it transmits signals to control the time at which the the transmit signal generator transmits signals to the transmitting transducer or transducer array 32 through a conductor 66. These signals control the sampling time and the repetition rate of the transmitted ultrasonic signals for the purpose of scanning across a range of sample times and rates for increased precision.

The pressure sensor 37 is electrically connected to the time control and computation system 48 to transmit depth information thereto and the information input system 49, which includes a computer keyboard and other input devices, supplies information to the time control and computation system 48, such as a cross-sectional area of the flow stream. With these parameters, the time control and computation system 48 is able to calculate the area of flow in the flow stream and the average velocity, and from that, calculate the rate of flow of liquid in the flow stream in a manner known in the art.

In FIG. 5, there is shown a block diagram of the input section 40 having an input amplifier 90, a band-pass filter 92 and an automatic gain amplifier 94. The amplifier 90 is connected through a very short conductor 64 to be as close as possible to the transducer 34 and thus receive a minimum amount of noise prior to amplification of the signal from the transducer 34. The band-pass filter 92 is electrically connected to the amplifier 90 to receive the amplified signal from the transducer 34. It has a center frequency set at the transmit frequency and passes signals within four percent of the transmitted signal on either side of its center frequency. Signals outside this range are attenuated greatly.

The four percent band of frequencies is selected because, when the possible velocities of the liquid are considered, the maximum Doppler shift on either side of transmitted frequency is less than four percent of the transmitted frequency. The center frequency of the band-pass filter 92 is set to the transmitted frequency and thus the four percent includes all frequencies of interest and attenuates noise signals outside of that band. The size of the band is related to the selected transmitted frequency of the ultrasound and the circuit covers the band with either a positive shift in frequency or a negative shift in frequency, depending on the direction of flow of the liquid with respect to the transducer 34.

The output from the band-pass filter 92 is transmitted through conductor 93 to the automatic gain control amplifier 94 which provides a constant amplitude signal to the conductor 74 containing only frequencies within the probable range of the transmitted frequency that accounts for all of the most probable velocities of the liquid. The automatic gain control amplifier 94 receives signals from the time control and computation system 48 (FIG. 4) through cable 57 to set an amplitude level for the output signals on conductor 74.

In FIG. 6, there is shown a block diagram of the reflection processing circuit 42 having an amplitude signal processing section 100, a direction signal processing section 102 and an analog-to-digital convertor section 104. The amplitude signal processing circuit section 100 and the direction signal processing circuit section 102 are substantially identical but receive clock pulses at different times with the amplitude signal processing circuit 100 receiving first clock pulses on conductor 50 and the direction signal processing circuit section 102 receiving second clock pulses on conductor 52, which first and second clock pulses are spaced from each other a time duration which is approximately 90 degrees or one-quarter of a cycle removed so that the timing indicates the direction of motion of the fluid.

The amplitude signal processing circuit section 100 includes a synchronous sampler 110, an anti-alias, low-pass filter 112, a variable low-pass filter 114 and a level shift circuit 118. Similarly, the direction signal processing circuit section 102 includes a synchronous sampler 120, an anti-alias, low-pass filter 122, a variable low-pass filter 124 and a level shift circuit 128. Since both of these circuit sections operate in the same manner, only the amplitude signal processing section 100 will be described.

The synchronous sampler 110 serves as a mixer, receives clock pulses at the frequency of the transmitted ultrasound and produces a complex waveform representing the frequencies caused by the Doppler effect. For this purpose, it has its input electrically connected to the output of the input circuit 40 (FIG. 4) through conductor 74 and to the source of clock pulses 50. The output of the synchronous sampler 110 is electrically connected to the anti-alias, low-pass filter 112 which filters out high frequencies that would otherwise cause errors known to be caused by such high frequencies.

To obtain higher resolution at lower velocities, the variable, low-pass filter 114 receives the output from the anti-alias, low-pass filter 112 and a clock pulse on conductor 54 to control the cut-off frequency. The cut-off frequency on the variable, low-pass filter 114 is one one-hundredth of the clocked signal on conductor 54. With this arrangement, the received signal strength is dependent upon the concentration of the reflecting particles and does not contain as noise the transmitted frequency. However, low concentrations provide lower intensity signals, and higher concentrations produce higher intensity signals. This signal is transmitted to the level shift circuit 118.

The output from the level shift circuit 118 is electrically connected to the analog-to-digital converter 132 and the output of the level shift circuit 128 is applied to the analog-to-digital converter 134 to generate a digital signal for application to the time-control and computation system 48 through conductors 70 and 72. This circuit clocks the information from the level shifters into it from the conductors 58. The time-control and computation system 48 performs the Fourier transform upon receiving data and computes the average of the selected coefficients for the frequency components to provide an average value of the frequency components and thus of the velocity.

Figure 7:
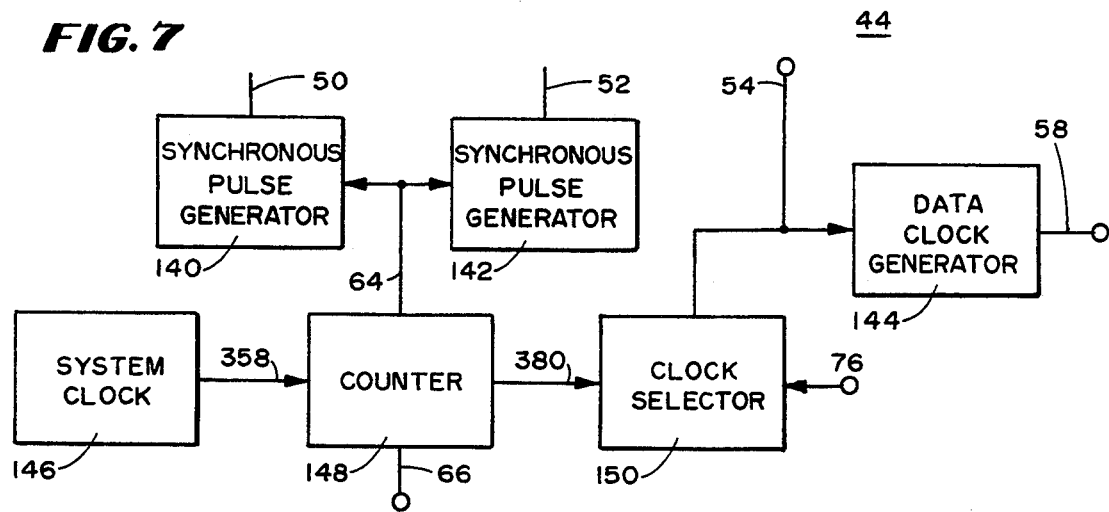
FIG. 7 is a block diagram of a timing section used in the embodiment of FIG. 4.

In FIG. 7, there is shown a block diagram of the timing circuit 44 having a first synchronous pulse generator 140, a second synchronous pulse generator 142, a data clock generator 144, a system clock 146, a counter 148 and a clock selector 150. The counter 148 counts pulses from the system clock 146 and applies outputs to the first and second synchronous pulse generators 140 and 142 which are spaced by 90 degrees for application to the conductors 50 and 52. The conductors 50 and 52 are the clock pulse conductors applied to the synchronous samplers 110 and 120 (FIG. 6) to respectively control the amplitude signal processing section and the direction signal processing section. The system clock 146 is set at a rate that is a multiple of two of the transmit frequency.

The counter 148 divides the clock pulse by successive multiples of two, and one of these pulses is used to drive the first synchronous pulse generator 140. Clock selector 150 also receives pulses from the counter 148 through conductor 380 and multiplexes these pulses to the variable low-pass filters 114 and 124 (FIG. 6) on conductor 54 and to the data clock generator 144. The data clock generator 144 receives pulses from the clock selector 150 and applies them to conductor 58 to time the acquisition of data from the analog-to-digital converters 134 and 132 (FIG. 6). This data sampling is set slightly higher than the Nyquist rate so that a maximum amount of the available range is used when the fast Fourier transform conversion calculations are done.

The counter 148 applies clock pulses at any of a number of different frequencies through the group of conductors 380 to the clock selector. The clock selector selects a pulse repetition rate in response to a signal on conductor 76 from the computer and applies it to the data clock generator 144 and to the variable low-pass filter 114 (FIG. 6). The data clock generator 144 in return controls the sampling rate by controlling the readout from the analog-to-digital convertors 134 and 132 (FIG. 6).

The processor repeatedly determines the energy in each of the different frequency bins in the fast Fourier transformer. The energy in these bins represents the coefficients of the terms of the Fourier transform for each of the frequencies considered. Ideally, most of the energy will be in a certain frequency area representing the velocity of the central flow path with higher and lower frequencies on either side. If the fast Fourier transform does not provide this configuration, the signal on conductor 76 will change the clock selection rate so that if the energy is too close to the low frequency end of the spectrum, the cutoff rate will be dropped by lowering the repetition rate from the clock selector 150 and if the energy is concentrated too close to the higher frequency terms of the Fourier transform, the rate will be increased until a representative profile is selected for the different velocities in the flow stream.

In general, an attempt is made to receive Doppler shift information from the entire cross-section of the stream. The signals are intended to represent all of the actual velocities and the cross-sectional area of each of the velocities. These velocities and cross-sectional areas may be represented in a curve, with the velocities being represented along the abscissa and the amount of area of the cross-section having each velocity or small range of velocities as the ordinates when viewed graphically. These values are measured with the Doppler frequency shift representing the velocity and the amplitude of the received ultrasonic signal as the area having that velocity.

This information is used to obtain the average velocity. However, some errors in the received signals occur such as those caused by differences in turbidity at different locations or the inaccessibility of certain parts of the cross-section of the flow stream to transmitted signals or inability to reflect signals truly representative of the cross-sectional area. Such errors may be detected such as by testing in an experimental flow stream in a laboratory. Thus, errors related to turbidity or related to particular diameter pipes or to different levels of liquid in the pipes or to combinations of the above can be determined. Accordingly, empirical corrections may be made where such effects are observed even though the system itself is basically designed to obtain pure Doppler shift information indicating pure average velocity directly.

Figure 8:
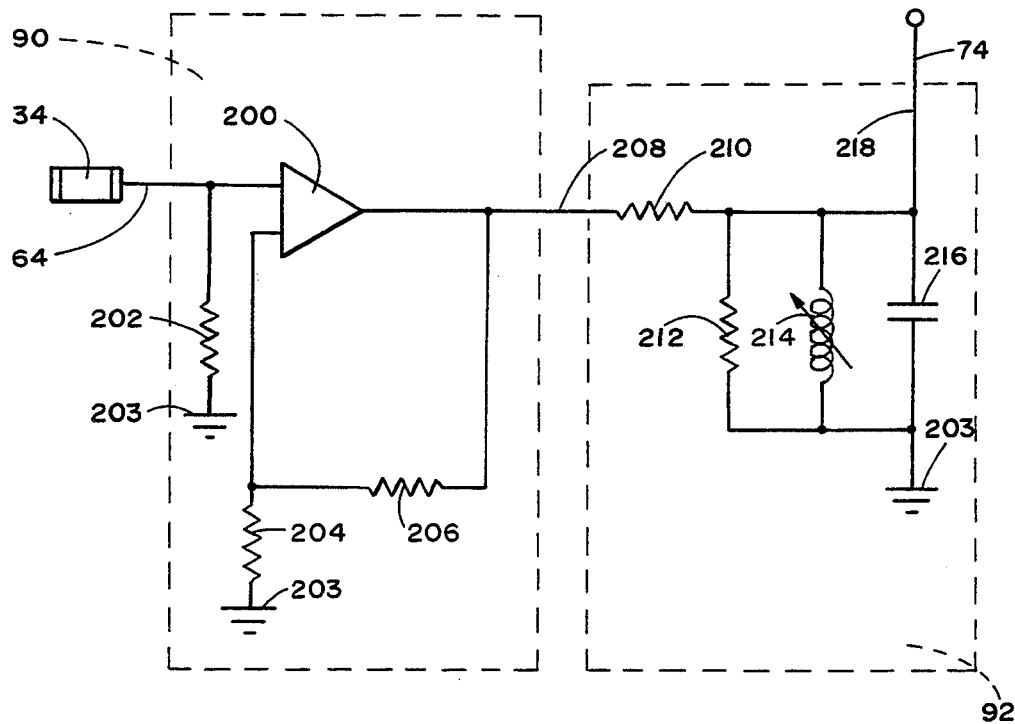
FIG. 8 is a schematic circuit diagram of an amplifier, and band-pass filter included in the embodiment of FIG. 5.

In FIG. 8, there is shown a schematic circuit diagram of the amplifier 90 and the band-pass filter 92 shown in block diagram form in FIG. 5. As shown in FIG. 8, the input of the amplifier 90 is electrically connected to conductor 64 and has its output electrically connected to one of the inputs of the band-pass filter 92, the other input being connected to a ground 203.

The amplifier 90 includes a Texas Instrument TLE2027 amplifier 200, having its noninverting input electrically connected to conductor 64 and to a ground 203 through a one kilohm resistor 202. Its inverting input is electrically connected to ground through a 10.0 kilohm resistor 204 and to its output through a 49.9 kilohm resistor 206. The output of the amplifier 200 is also electrically connected to one input of the band-pass filter 92 through a conductor 208.

The band-pass filter 92 has its input electrically connected to conductor 208 at one end of a 5.1 kilohm resistor 210, the other end of which is electrically connected to: (1) one end of a 10K resistor 212; (2) an ajustable inductor 214; (3) a 1000 picofared capacitor 216; and (4) the output conductor 218. At the other end of the resistor 212, variable inductor 214 and capacitor 216 are electrically grounded at a ground 203.

Figure 9:
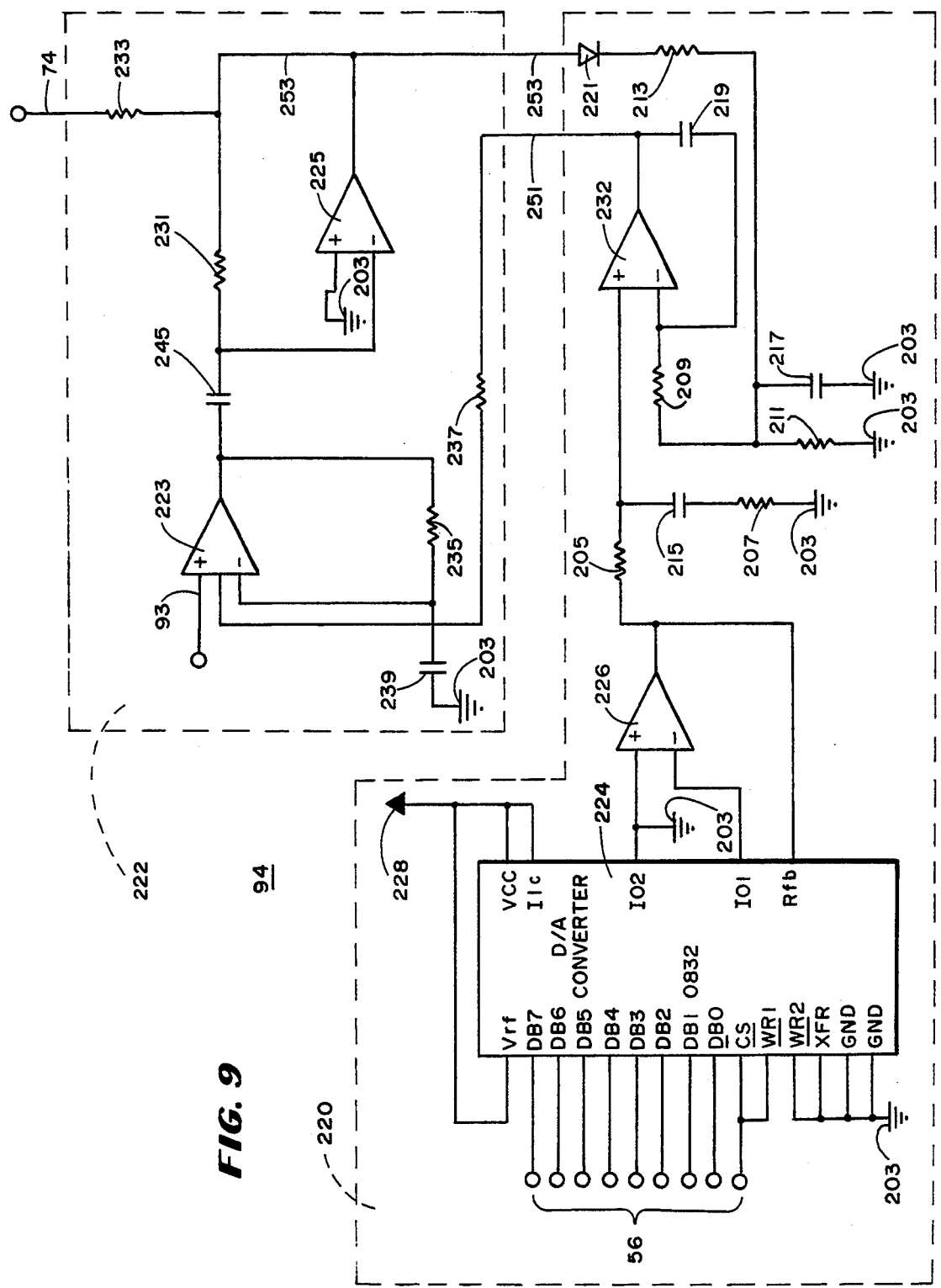
FIG. 9 is a schematic circuit diagram of an adjustable-gain automatic gain control circuit used in the embodiment of FIG. 6.

In FIG. 9, there is shown a schematic circuit diagram of the automatic gain control circuit 94 having an amplitude level setting circuit 220 and an automatic gain control circuit 222 interconnected to each other to provide automatic gain and level control. In this circuit, the cable 56 applies signals to the level control circuit 220 to set a level for variations of the input amplitude and the input amplitude is applied through conductor 93 to the automatic gain control circuit 222 with the level control circuit 220 being connected to the automatic gain control circuit 222 to cause the signal on conductor 74 to vary about a level set in accordance with the signal received on conductor 56 within limits controlled by the automatic gain control circuit 222.

The level control circuit 220 includes a digital-to-analog circuit 224, a first amplifier 226, and a second amplifier 232. The digital-to-analog converter 224 is electrically connected to receive digital signals on the cable 56 from the time control and computation system 48 (FIG. 4) and apply them to CMOS operational amplifier 226 manufactured by National Semiconductor located at 2900 Semiconductor Drive, P.O. Box 58090, Santa Clara, Calif. 95052-8090 under the part no. LPC662AIN. The output of operational amplifier 226 is electrically connected to the second amplifier 232 which is also a CMOS operational amplifier manufactured by National Semiconductor as part no. LPC662AIN, the output of which is electrically connected to the automatic gain control circuit 222 through a conductor 251.

The digital-to-analog converter 224 is a 0832 chip, manufactured by National Semiconductor as part no. DAC0832LCN, having its IO2 electrically connected to the noninverting input terminal of the operational amplifier 226 and connected to ground 203. Its IO1 output terminal is electrically connected to the inverting terminal of the amplifier 226 and its reference B terminal is electrically connected to the output of the operational amplifier 226. The reference voltage input terminals Vrf, VCC, and I1c are electrically connected to a source of positive voltage 228 and the WR2, not-XFR, and ground input terminals are connected to ground 203. The conductors 56 are electrically connected to its input terminals.

The amplifier 226 is manufactured by Linear Technology, 1630 McCarthy Blvd., Milipitus, Calif.

95035-7487 as part no. LT1037CNB. Its output is at a fixed level of voltage controlled by the conductors 56, and is applied to the noninverting input terminal of the amplifier 232 through a 10K resistor 205. The noninverting terminal is also electrically connected to ground 203 through a 0.47 microfarad capacitor 215 and a 15 ohm resistor 207. The inverting input terminal of the operational amplifier 232 is electrically connected: (1) to ground through a 750 kilohm resistor 209 in series with the parallel resistor 211 and capacitor 217, having values of 5.1 kilohom and 0.001 microfarad, respectively. It is also electrically connected to conductor 251 through the 0.1 microfarad capacitor 219 and to conductor 253 through the resistor 209, a 220 ohm resistor 213 and the reverse resistance of a 1N914 diode 221 having its anode electrically connected to the conductor 253. The output of the amplifier 232 is directly connected to conductor 251.

The automatic gain control circuit 222 includes a first 3080 operational amplifier 223 and a second LT1037 operational amplifier 225. The operational amplifier 223 is an OTA amplifier and is manufactured by National Semiconductor as part no. LM3080AN. The amplifier 223 receives signals on conductor 93 from the band-pass filter 92 (FIG. 5) representing the received complex wave form. It has its output electrically connected to the inverting input terminal of the operational amplifier 225. The output of the operational amplifier 225 is electrically connected to output conductor 74 to apply the signal to the synchronous samplers 110 and 120 (FIG. 6).

The operational amplifier 223 has its noninverting input terminal electrically connected to conductor 93, its inverting input terminal: (1) electrically connected to ground 203 through a 0.1 microfarad capacitor 239 and to its output terminal through a 1 kilohm resistor 235. Its control input terminal is electrically connected to conductor 251 through a 49.9 kilohm resistor 237 and its output terminal is electrically connected to: (1) the inverting input terminal of the amplifier 225 through a 0.001 microfarad capacitor 245; (2) to conductor 74 through the capacitor 245, a 100 kilohm resistor 231 and a 1 kilohm resistor 233; (3) to the output of the amplifier 225 through the capacitor 245 and resistor 231 and to conductor 253 through capacitor 245 and resistor 231. The noninverting input terminal of the amplifier 225 is grounded at 203 and its output is electrically connected to conductor 253 and thus to the anode of the diode 221. With this arrangement, the voltage on conductor 74 is controlled within limits by the voltages on 251 and 253 and varies between those limits in proportion to the signal on conductor 93.

Figure 10:
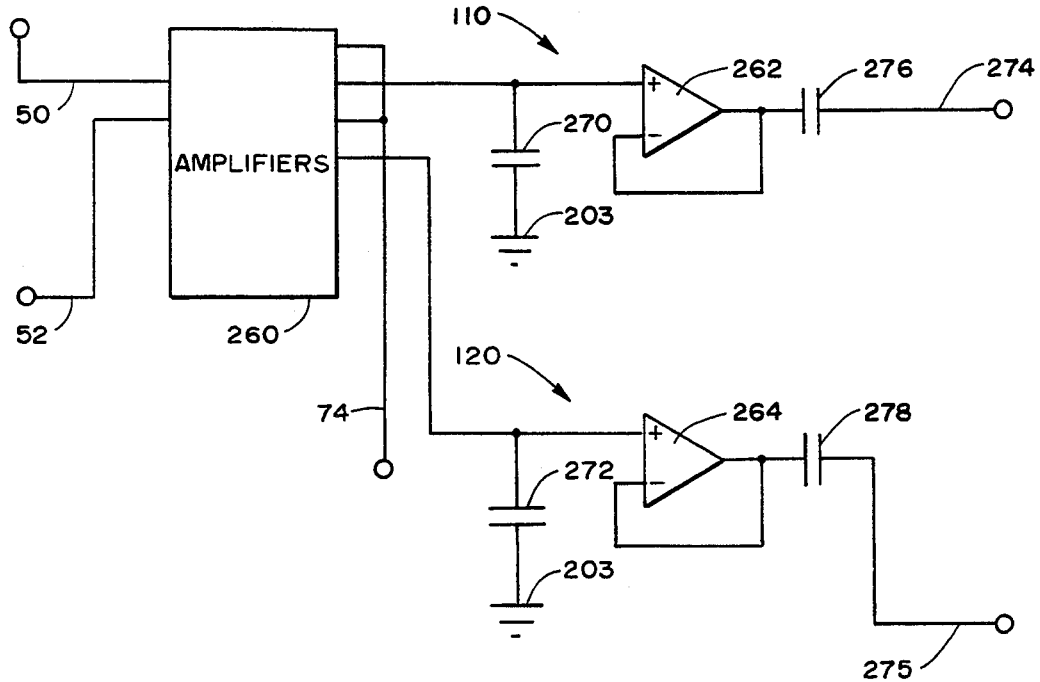
FIG. 10 is a schematic circuit diagram of two synchronous samplers used in the embodiment of FIG. 6.

In FIG. 10, there is shown a schematic circuit diagram of the synchronous samplers 110 and 120 of FIG. 6. Each of the samplers includes a different one of two sample and hold circuit electrically connected to the same Texas Instrument SN74AC4316N chip 260 that applies samples to them from conductor 74 under the control of the signals on conductors 50 and 52. To store the samples, the two sample and hold circuits each include one of the individual amplifiers 262 and 264 respectively connected to different outputs of the chip 260 and different ones of the capacitors 270 and 272 to store the samples.

To receive signals from the band pass filter 92 (FIG. 8) representing received signals, the input conductor 74 is electrically connected to 1Y and 2Y inputs of the chip 260, which selects different portions of the input signal from the transducer on conductor 74 for application to the sample and hold circuits. The sample and hold circuits form a part of the first synchronous sampler 110 and the second synchronous sampler 120 with the 1Z output from the chip 260 being electrically connected to the noninverting input terminal of the amplifier 262 and the 2Z output of the chip 260 being electrically connected to the noninverting input terminal of the amplifier 264 in the synchronous sampler 110 and 120 respectively. Conductor 50 from the synchronous pulse generator 140 (FIG. 7) is electrically connected to the 1S input terminal of the chip 260 and conductor 52 from the synchronous pulse generator 142 (FIG. 7) is electrically connected to the 2S input of the chip 260 to provide timing pulses to be sampled from the signal on conductor 74 by the sample and hold circuit respectively into the amplifier 262 and 264 so as to time the output of the sampled signals to be 90 degrees spaced from each other for the purpose of determining the direction of flow. The direction is indicated by a Fourier transform within the microprocessor.

The noninverting input terminal of the amplifier 262 is grounded through a 0.001 microfarad capacitor 270 that serves as one storage device for samples in one of the two sample hold circuits and the noninverting input terminal of the amplifier 264 is grounded through a similar 0.001 microfarad capacitor 272 which serves as the storage device for samples in the other of the pair of sample and hold circuits. The inverting input terminal of the amplifier 262 is electrically connected to the output of the amplifier 262 and the inverting input terminal of the amplifier 264 is electrically connected to its output. The output of the amplifier 262 is electrically connected to output conductor 274 through a 0.47 microfarad capacitor 276, and the output of amplifier 264 is electrically connected to output conductor 274 through a 0.47 microfarad capacitor 278.

Figure 11:
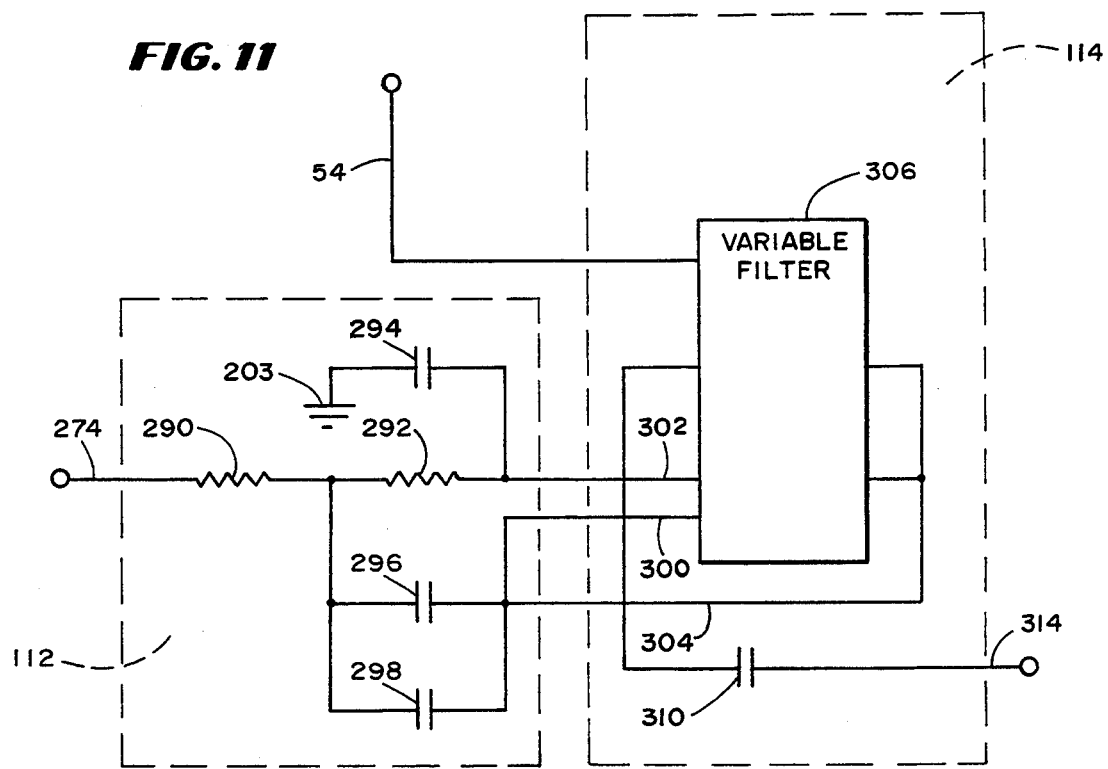
FIG. 11 is a schematic circuit diagram of an anti-alias, low-pass filter and variable, low-pass filter used in the embodiment of FIG. 6.

In FIG. 11, there is shown a schematic circuit diagram of the anti-alias, low-pass filter 112 and the variable, low-pass filter 114. The anti-alias, low-pass filter 122 and the variable, low-pass filter 124 (FIG. 6) are identical in structure to the anti-alias, low-pass filter 112 and the variable, low-pass filter 114 and only the anti-alias, low-pass filter 112 and only the variable, low-pass filter 114 will be described herein.

The anti-alias, low-pass filter 112 is electrically connected to the synchronous sampler 110 (FIG. 6) by conductor 274 and includes a first 22.1 kilohm resistor 290, a second 22.1 kilohm resistor 292, a first 1000 picofarad capacitor 294, a second 1000 picofarad capacitor 296, and a third 1000 picofarad capacitor 298. The input conductor 274 from the synchronous sampler 110 (FIG. 6) is electrically connected to an output connector 302 that is connected to the variable, low-pass filter 114 through the resistors 290 and 292 in series in the order named. The capacitor 294 has one plate electrically connected to the conductor 302 and the other is connected to a ground 203. The capacitors 296 and 298 each have one plate electrically connected between the resistors 290 and 292 and their other plates electrically connected to output conductor 300 and output conductor 304, both of which are electrically connected to the variable, low-pass filter 114.

The variable, low-pass filter 114 is electrically connected through conductor 54 to the clock selector 150 (FIG. 7) to adjust the filter band. The chip 306 is a National semiconductor MF6CJ-100 variable filter and provides the filtered output to conductor 314 from output terminal FO through a 0.47 microfarad capacitor 310.

Figure 12:
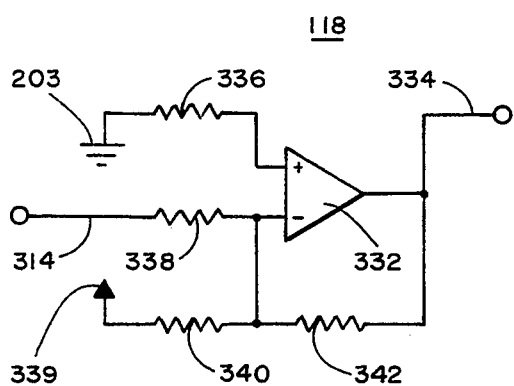
FIG. 12 is a schematic circuit diagram of a level-shift circuit used in the embodiment of FIG. 6.

In FIG. 12, there is shown a schematic circuit diagram of the level shift circuit 118 electrically connected to conductor 314 (FIG. 10) to shift their level before applying them to the analog-to-digital converter 132 (FIG. 6) through a conductor 334. The level shift circuit 118 is identical to the level shift circuit 128 (FIG. 6) and only the level shift circuit 118 will be described in detail.

The level shift circuit 118 includes a National semiconductor LF353N amplifier 332 with its noninverting input terminal connected to a ground 203 through a 169 kilohm resistor 336 and its inverting input terminal electrically connected to input conductor 314 through a 499 kilohm resistor 338, to a 2 volt reference voltage 339 through a 499 kilohm resistor 340 and to a level shift output terminal on conductor 334 through a 499 kilohm resistor 342.

Figure 13:
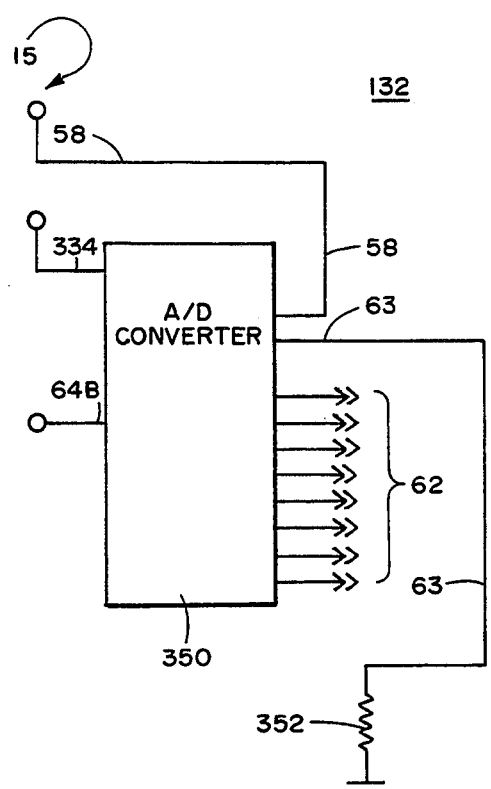
FIG. 13 is a schematic circuit diagram of an analog-to-digital converter used in the embodiment of FIG. 6.

In FIG. 13, there is shown an analog-to-digital converter circuit 132 identical to the analog-to-digital converter circuit 134 (FIG. 6) and only the analog-to-digital converter 132 will be described herein. The analog-to-digital converter 132 has a National semiconductor ADC0804 analog-to-digital converter 350 receiving the data clock signals from conductor 58 on input terminal not-WR, analog input signals on conductor 334 on V+ input terminal and provides its output signal from output conductor not-INT to conductor 63. Conductor 63 is electrically connected to ground through a 100 kilohm resistor 352.

The analog-to-digital converter circuit 132 receives the output signals from the level shift circuit 118 (FIG. 6) on conductor 334 and clock signals from the data clock generator 144 (FIG. 7) on conductor 58 and provides a digital signal to the microprocessor on output conductor 62. The digital signals on conductor 62 are electrically connected to a Hitachi, HD64180, 8-bit microprocessor. This microprocessor is available from Hitachi American, Ltd., Semiconductor and IC Division, 2210 O'Toole Avenue, San Jose, Calif. 95131.

Figure 14:
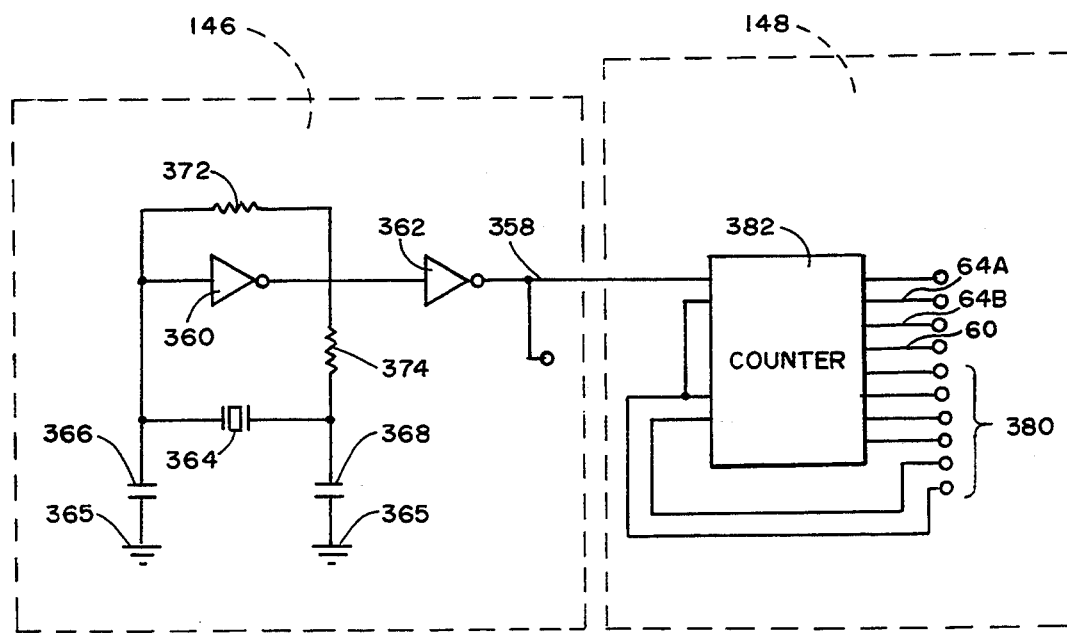
FIG. 14 is a schematic circuit diagram of a system clock and counter used in the embodiment of FIG. 7.

In FIG. 14, there is shown a schematic circuit diagram of the system clock circuit 146 and of the counter 148 electrically connected together with the output of the system clock circuit 146 being applied through conductor 358 to the counter 148. The system clock 146 includes first and second inverters 360 and 362, a four megahertz crystal 364, first and second capacitors 366 and 368, respectively, and two resistors 372 and 374. The crystal 364 is in a circuit arrangement with the capacitors, resistors, and amplifiers to provide a stable four megahertz clock frequency to conductor 358 for application to the counter 148 and to other circuits.

The four megahertz crystal 364 of the system clock 146 has each of its two electrodes connected to a ground 365 through different ones of the 25 picofarad capacitors 366 and 368. One electrode is connected through the inverter 360 to the other electrode through a 2.2 kilohm resistor 374 to provide feedback signals. The inverter 360 is by-passed by a 2.2 megohm resistor 372 to adjust the feedback signal, and the output of the inverter 360 is applied to the output conductor 358 through the inverter 362 to provide pulses at four megahertz to the conductor 358 for counting by the counter 148.

To provide a series of counts to the clock selector 150 (FIG. 7), the counter 148 includes a Texas Instrument SN74HC4040N having its input terminal electrically connected to conductor 358 to receive count pulses and having its output conductors 380 electrically connected to the clock selector circuit 150 (FIG. 7) to provide a succession of pulses counted from the clock input pulses 358. Output conductors 64A and 64B are electrically connected to the synchronous pulse generator 140 (FIGS. 7 and 15) and to the synchronous pulse generator 142 (FIGS. 7 and 16) alternately at 90 degree time periods to clock these two pulse generators so as to provide phased pulses to their output conductors 50 and 52 (FIG. 16). An output conductor 60 is electrically connected to the transmit signal generator 46 (FIG. 4) to control the timing of the transmission of signals by the transmitting transducer or transducer array 32 (FIGS. 2, 3 and 4). Each of the conductors 380 provide a different one of 500 kHz (kilohertz), 250 kHz, 125 kHz, 62.5 kHz, 31.25 kHz and 15.625 kHz clock pulses.

Figure 15:
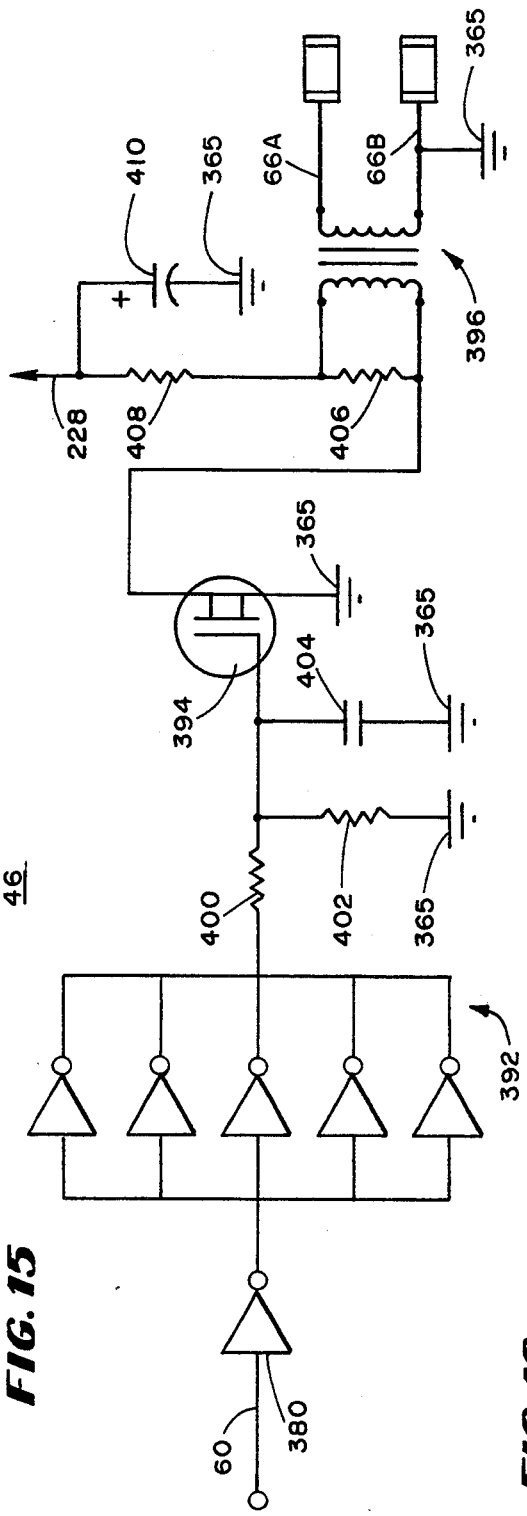
FIG. 15 is a schematic circuit diagram of a transmit signal generator used in the embodiment of FIG. 4.
Figure 16:
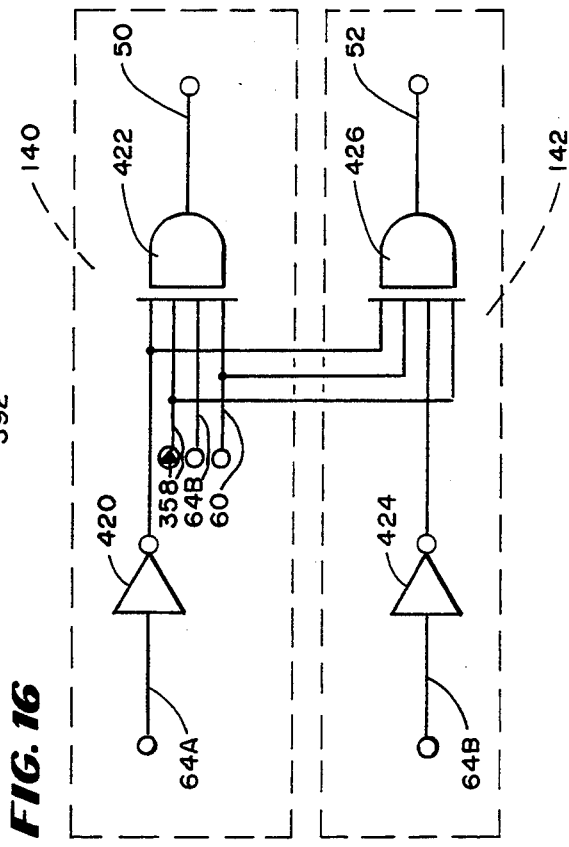
FIG. 16 is a schematic circuit diagram of two synchronous pulse generators used in the embodiment of FIG. 7.

In FIG. 15, there is shown a schematic circuit diagram of the transmit signal generator 46 having an input conductor 60 and output conductors 66A and 66B with a first inverter 390, an inverter array of five parallel-connected identical inverters 392, a TN0401 insulated gate N-channel, three-terminal semiconductor 394 and an output transformer 396 connected in series in the order named between the pulse input conductor 60 and output conductors 66A and 66B that are connected to the transmit transducer.

The inverters are all Texas Instrument SN74HC04N amplifiers which receive the pulse input and transmit it to the insulated gate, N-channel three-terminal semiconductor 394 through a 15 ohm resistor 400 and a filter path having in parallel a first 100K resistor 402 connected to a ground 365 and a 0.001 microfarad capacitor 404 connected between the gate of the insulated gate N-channel semiconductor 394 and a ground 365. The source of the semiconductor 394 is connected to a ground 365, and the drain is connected to one end of a 2.2K resistor 406 and one end of the primary winding of the transformer 396. The other end of the resistor 406 and primary winding of the transformer 396 are electrically connected through a 75 ohm resistor 408 to the positive 5 voltage source 228 and to ground through a 1000 microfarad capacitor 410. The secondary of the transformer 396 has one end of the secondary winding connected to a ground 365 and both ends electrically connected to the transmit transducer 32 (FIG. 4) through conductors 66A and 66B.

In FIG. 16, there is shown a schematic circuit diagram of the first and second synchronous pulse generators 140 and 142. To generate pulses that are synchronous with the transmitting pulses, the synchronous pulse generator 140 includes an inverter 420 and an AND gate 422, with the input to the inverter 420 being electrically connected to conductor 64A to receive pulses from the counter 148 (FIGS. 7 and 13) in synchronism with the system clock 146 (FIG. 7 and 14).

The output terminal of the inverter is electrically connected to one of the four inputs connected to the AND gate 422, each of the other three inputs being electrically connected to a different one of: (1) conductor 358 to receive clock pulses directly; (2) the conductor 64B to receive clock pulses that are 90 degrees removed from the transmitted input pulse; and (3) conductor 60 to receive pulses from the counter 382 (FIG. 13) in synchronism with the pulses that are transmitted to the transmitter. With this arrangement, the gate 422 transmits pulses on conductor 50 in synchronism with the transmitted pulses from the transducer.

To transmit pulses on conductor 52 that are one-quarter period removed from the transmitted pulses to the synchronous pulse generator 142, the synchronous pulse generator 142 includes an inverter or amplifier 424 and an AND gate 426. The input to the inverter 424 is electrically connected to conductor 64B to receive pulses 90 degrees removed from the pulses applied to conductor 64A with respect to the transmitted pulses. The AND gate 426 has: (1) one of its four inputs electrically connected to the output of the amplifier 420 to receive inverted pulses from conductor 64A; (2) another input is connected to conductor 60 to receive signals timed in conjunction with the transducer signals; (3) a third input electrically connected to the output of the amplifier 424 to receive inverted signals from conductor 64B; and (4) the fourth input electrically connected to conductor 358 to receive the clock pulses from the system clock pulse generator. This results in an output pulse to the conductor 52 that is 90 degrees removed from the pulses on conductor 50 which are in synchronism with the transmitted pulses.

Figure 17:
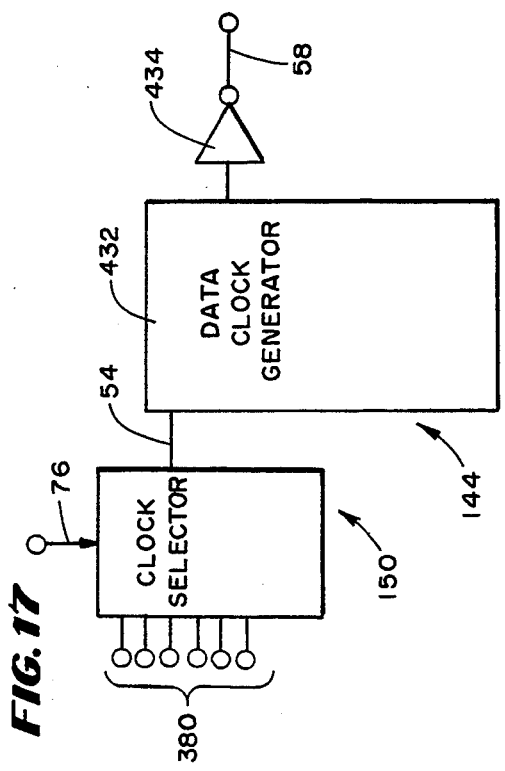
FIG. 17 is a schematic circuit diagram of a clock selector and a data clock generator used in the embodiment of FIG. 7.

In FIG. 17, there is shown a schematic circuit diagram of the clock selector 150 and the data clock generator 144. The clock selector 150 receives a plurality of different frequency clock pulses on conductors 380 from the counter 148, selects one to obtain the desired energy distribution and applies it as a clock signal on conductor 54 to the clock input terminal of the data clock generator 144. This clock selector is a Texas Instrument SN74HC151N semiconductor chip.

The data clock generator 144 includes a Motorola MCI 4059N semiconductor 432 and an inverter 434. The semiconductor 432 is electrically connected to receive pulses from the clock selector 150 on conductor 54 and to apply timed signals therefrom to the input of the inverter 54 which applies them in turn to conductor 58 for application to the analog-to-digital converters 130 and 132 (FIG. 6) to cause information to be written from the analog-to-digital converters 130 and 132 into the microprocessor.

In FIG. 18, the program performed by the time-control and computation system 48 (FIG. 4) is shown in block diagram form including the subroutine 160 for initializing and timing the sample. The initializing and timing step 160 includes the substep 166 of waiting for a sample-time signal indicating the velocity has been calculated from the last sample, and the substep 168 of initializing the microprocessor after turning it on, if necessary.

After these two steps, the microprocessor performs the step 170 of acquiring data from the receiving transducer, the step 172 of checking the voltage to see that it is within limits, and if not, the step 180 of adjusting the amplification and reacquiring the data in step 170.

If it is within limits, the step 174 is performed by obtaining a fast Fourier transform and determining the direction and approximate speed at 176. From this information, the sample rate is set at 178 and the signal proceeds to calculate the final velocity in subroutine 162.

In the performance of the subroutine 162, the step 182 of acquiring the data is performed, the voltage is checked at step 184 to see if it is within limits, and if not, the step 190 is performed to adjust the amplification and the step 182 is performed by drawing the data again from memory and processing it to the fast Fourier transform step 186. Following the step 186 of determining the Fourier transform, the velocity 188 is calculated by averaging the principal coefficients of the Fourier transform.

With this arrangement, the stored digital data can first be utilized to calculate an approximate speed and direction and then this approximation may be used to calculate velocity or new samples can be taken to calculate velocity. In both steps, the same data can be used more than once after adjusting parameters such as the amplitude of the signals for a more precise calculation but in the preferred embodiment, the data is used once.

From the above description, it can be understood that the system of this invention and the method of this invention may be utilized to precisely calculate the average velocity of a fluid stream and has several advantages, such as: (1) automatically adjusting to variations in flow turbidity rather than controlling raw signal with automatic gain control; (2) making measurements without an empirically determined factor related to flow stream; (3) adjusting for energy distribution of measured Doppler shifts to improve precision; and (4) being economical.

While a preferred embodiment of the invention has been described with some particularity, many modifications and variations in the system are possible without deviating from the invention. Therefore, it is to be understood that, within the scope of the appended claims, the invention may be practiced other than as specifically described.

What is claimed is:

1. A method of determining the average velocity of a fluid stream comprising the steps of:
    transmitting an ultrasonic signal into the fluid stream at an angle so that it traverses at least a representative portion of the cross sectional area of the flow stream;
    receiving reflected ultrasonic signals from said at least a representative proportion of cross section of the flow stream;
    converting the received reflected ultrasonic signals to electrical signals representing reflection from said at least a representative proportion of the flow stream; and
    utilizing substantially all of the electrical signals representing reflection from said at least a representative proportion of the flow stream to calculate an approximate average velocity of the flow stream;
    wherein the step of utilizing substantially all of the electrical signals representing reflection from at least a representative proportion of the flow stream to calculate an approximate average velocity of the flow stream includes the substeps of performing a Fourier transform on said electrical signals and averaging certain of the coefficients of the Fourier transform.

2. A method of determining the average velocity of a fluid stream comprising the steps of:
    transmitting an ultrasonic signal into the fluid stream;
    receiving reflected ultrasonic signals;
    converting the received reflected ultrasonic signals to digital form; and
    utilizing the digital signals to calculate an approximate average velocity by performing a Fourier transform on said digital signals and averaging certain of the coefficients of the Fourier transform.

3. A method according to claim 2 further including the step of sampling information at an adjustable sampling rate and frequency spectrum of the Fourier transform and adjusting at least one of the sampling rate and frequency spectrum during calibration until precision is substantially maximized.

4. A method according to claim 3 in which the step of adjusting at least one of the coefficients and frequency spectrum of the Fourier transform includes the steps of normalizing a largest amplitude coefficient and eliminating certain lower coefficients.

5. A method in accordance with claim 2 in which a sampling rate of digital data from an analog signal corresponding to the received ultrasonic signal is varied based on a prior fast Fourier transform.

6. A method according to claim 2 in which the received reflected ultrasonic signals are mixed with signals having a frequency proportional to the transmitted ultrasonic signal to obtain a Doppler shift signal.

7. A method according to claim 2 in which the received reflected ultrasonic signals are filtered to attenuate signals not within a predetermined range of frequencies of the transmitted ultrasonic signal.

8. A method of determining the average velocity of a fluid stream comprising the steps of:
 transmitting an ultrasonic signal into the fluid stream;
 receiving reflected ultrasonic signals containing velocity information;
 converting the received reflected ultrasonic signals to digital form;
 utilizing the digital signals to calculate an approximate velocity by performing a Fourier transform on said digital signals and averaging certain of the coefficients of the Fourier transform;
 sampling said velocity information at a first sampling rate and using the sampled information to perform a first velocity calculation;
 utilizing a first calculated velocity value from said first velocity calculation to recalculate a second sampling rate; and
 using the second sampling rate to calculate a more precise second velocity value.

9. An apparatus for determining the average velocity of a fluid stream comprising:
 means for transmitting an ultrasonic signal into the fluid stream at an angle so that it traverses at least a representative portion of the cross sectional area of the flow stream;
 means for receiving reflected ultrasonic signals from said at least a representative proportion of cross section of the flow stream;
 means for converting the received reflected ultrasonic signals to electrical signals representing reflection from said at least a representative proportion of the flow stream; and
 means for utilizing substantially all of the electrical signals representing reflection from said at least a representative proportion of the flow stream to calculate an approximate average velocity of the flow stream;
 wherein the means for utilizing substantially all of the electrical signals representing reflection from at least a representative proportion of the flow stream to calculate an approximate average velocity of the flow stream includes means for performing a Fourier transform on said electrical signals and averaging certain of the coefficients of the Fourier transform.

10. Apparatus for determining the average velocity of a fluid stream comprising:
 means for transmitting an ultrasonic signal into the fluid stream;
 means for receiving reflected ultrasonic signals;
 means for converting the received reflected ultrasonic signals to digital form; and
 means for utilizing the digital signals to calculate an approximate average velocity by performing a Fourier transform on said digital signals and averaging certain of the coefficients of the Fourier transform.

11. Apparatus for determining the average velocity of a fluid stream comprising:
 means for transmitting an ultrasonic signal into the fluid stream;
 Means for receiving reflected ultrasonic signals containing velocity information;
 means for converting the received reflected ultrasonic signals to digital form;
 means for utilizing the digital signals to calculate an approximate velocity by performing a Fourier transform on said digital signals and averaging certain of the coefficients of the Fourier transform;
 means for sampling said velocity information at a first sampling rate and using the sampled information to perform a first velocity calculation;
 means for utilizing a first calculated velocity value from said first velocity calculation to recalculate a second sampling rate; and
 means for using the second sampling rate to calculate a more precise second velocity value.

12. Apparatus according to claim 11 further including means for adjusting the amplitude of coefficients of the Fourier transform during calibration until precision is substantially maximized.

13. Apparatus in accordance with claim 11 in which the sampling rate of digital data from an analog signal corresponding to the received reflected ultrasonic signals is varied based on a prior fast Fourier transform.

14. Apparatus according to claim 11 further including means for mixing the received reflected ultrasonic signals with signals having a frequency proportional to the transmitted ultrasonic signal to obtain a Doppler shift signal.

15. Apparatus according to claim 14 in which the means for adjusting at least one of the coefficients and frequency spectrum of the Fourier transform includes means for normalizing a largest amplitude coefficient and eliminating certain lower coefficients.

16. Apparatus according to claim 15 further including means for filtering the received reflected ultrasonic signals to attenuate signals not within a predetermined range of frequencies of the transmitted ultrasonic signal.

* * * * *